United States Patent
Kelley et al.

(10) Patent No.: US 6,718,422 B1
(45) Date of Patent: Apr. 6, 2004

(54) ENHANCED BUS ARBITER UTILIZING VARIABLE PRIORITY AND FAIRNESS

(75) Inventors: Richard Allen Kelley, Apex, NC (US); Danny Marvin Neal, Round Rock, TX (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/363,947

(22) Filed: Jul. 29, 1999

(51) Int. Cl.[7] ............................................. G06F 13/36
(52) U.S. Cl. ........................ 710/309; 710/240; 710/244
(58) Field of Search ................................. 710/309, 111, 710/113, 116, 118, 240, 241, 243, 244

(56) References Cited

U.S. PATENT DOCUMENTS

| | | | | |
|---|---|---|---|---|
| 5,072,363 A | * | 12/1991 | Gallagher | 340/825.5 |
| 5,301,333 A | | 4/1994 | Lee | 395/725 |
| 5,388,228 A | | 2/1995 | Heath et al. | 395/325 |
| 5,440,752 A | | 8/1995 | Lentz et al. | 395/800 |
| 5,471,590 A | * | 11/1995 | Melo et al. | 710/108 |
| 5,481,680 A | * | 1/1996 | Larson et al. | 710/112 |
| 5,509,125 A | | 4/1996 | Johnson et al. | 395/300 |
| 5,546,548 A | * | 8/1996 | Chen et al. | 710/107 |
| 5,572,686 A | | 11/1996 | Nunziata et al. | 395/296 |
| 5,644,733 A | * | 7/1997 | Kalish et al. | 710/113 |
| 5,706,446 A | | 1/1998 | Kalish et al. | 395/293 |
| 5,754,800 A | | 5/1998 | Lentz et al. | 395/296 |
| 5,778,200 A | | 7/1998 | Gulick | 395/293 |
| 5,797,020 A | | 8/1998 | Bonella et al. | 395/728 |
| 5,805,840 A | | 9/1998 | Dutton | 395/296 |
| 5,842,025 A | | 11/1998 | Joffe | 395/728 |
| 5,881,313 A | | 3/1999 | Ramakrishnan et al. | 395/860 |
| 5,941,967 A | * | 8/1999 | Zulian | 710/107 |
| 6,006,303 A | * | 12/1999 | Barnaby et al. | 710/240 |
| 6,202,112 B1 | | 3/2001 | Gadagkar et al. | 710/118 |
| 6,272,580 B1 | * | 8/2001 | Stevens et al. | 710/116 |

FOREIGN PATENT DOCUMENTS

EP          665500          8/1995

OTHER PUBLICATIONS

*IBM Technical Disclosure Bulletin,* "VESA Local Bus Arbitration Scheme", vol. 38 No. 04, Apr. 1995, pp. 127–131.
*IBM Technical Disclosure Bulletin,* "Method of Implementing 'Fairness' Arbitration in Accessing a Computer System Bus", vol. 32 No. 12, May 1990, pp. 109–116.
*IBM Technical Disclosure Bulletin,* "Dynamic Workload Balancing", vol. 33 No. 1A, Jun. 1990, pp. 44–46.

* cited by examiner

Primary Examiner—Sumati Lefkowitz
Assistant Examiner—X. Chung-Trans
(74) Attorney, Agent, or Firm—Barry S. Newberger; Winstead Sechrest & Minick P.C.; Mark E. McBurney

(57) ABSTRACT

A bus arbiter for a computer system having a bus for connection to a plurality of bus devices where each bus device requests control of bus by use of a bus request signal. The bus arbiter contains logic which incorporates a fairness scheme for controlling and prioritizing the bus request signals based on a predetermined priority of each bus device and each bus device's prior access within a fairness cycle. Each device's prior access is tracked by bits in a data register and is determined by whether or not the device actually received or sent information over the bus, and not by a simple granting of access which could result in a retry signal.

31 Claims, 5 Drawing Sheets

ENHANCED BUS ARBITER UTILIZING VARIABLE PRIORITY AND FAIRNESS

TECHNICAL FIELD

The present invention relates in general to a method and system for data processing in general and, in particular, to a method and system for bus arbitration based on variable priority and fairness protocols.

BACKGROUND INFORMATION

A computer system typically includes several types of buses, such as system bus, local buses, and peripheral buses. Various electronic circuit devices and components are connected with each other via these buses such that intercommunication may be possible among all of these devices and components.

In general, a central processing unit (CPU) is attached to a system bus, over which the CPU communicates directly with a system memory that is also attached to the system bus. A local bus is intended for connecting certain highly integrated peripheral components on the same bus as the CPU. One such local bus is known as the Peripheral Component Interconnect (PCI) bus. Under the PCI local bus standard, peripheral components can directly connect to a PCI local bus without the need for glue logic. Thus, PCI provides a bus standard on which high-performance peripheral devices, such as graphics devices and hard disk drives, can be coupled to the CPU, thereby permitting these high-performance peripheral devices to avoid the general access latency and the bandwidth constraints that are associated with a peripheral bus. A peripheral bus such as an Industry Standard Architecture (ISA) bus, is for connecting various peripheral devices to the computer system. These peripheral devices typically include input/output (I/O) devices such as a keyboard, floppy drives, and printers.

Generally, each system bus, local bus, and peripheral bus utilizes an independent set of protocols (or rules) to conduct data transfers between various devices attached to it. Each of these protocols is designed into a bus directly and is commonly referred to as the "architecture" of the bus. In a data transfer between different bus architectures, data being transferred from the first bus architecture may not be in a form that is usable or intelligible by the receiving second bus architecture. Accordingly, a mechanism is developed for "translating" data that are required to be transferred from one bus architecture to another. This translation mechanism is normally contained in a hardware device in the form of a bus-to-bus bridge (or interface) through which the two different types of buses are connected.

Incidentally, various bus-to-bus bridges have been designed to match the communication protocol of one bus with that of another in order to permit system-wide communications between devices on different buses. For example, a bus-to-bus bridge connecting between a system bus and a PCI local bus is called a PCI host bridge. The PCI host bridge contains all the logic and hardware for translating data communications between the system bus and the PCI local bus, and ensures that data is transferred between these two buses intelligibly.

If multiple devices connected to the different buses gained access to the CPU or even a local bus at the same time, chaos would result. Chaos is avoided by introducing one or more bus masters into the system. A bus master controls access to the bus. In other words, it initiates and controls all bus requests.

Deciding which device or bus master to use the bus next is called bus arbitration. In a bus arbitration scheme, a device (or the processor) wanting to use the bus signals a bus request. In response, at a later point in time the arbiter sends a grant signal to the device. After the grant is received, the device can use the bus. The device later signals to the arbiter that the bus is no longer required. The arbiter can then grant the bus to another device.

Arbitration schemes usually try to balance two factors in choosing which device to grant the bus. First, each device has a bus priority, and the highest-priority devices should be serviced first. Second, to assure that no device, even with low priority, is never completely locked out, most I/O buses such as PCI also require that the arbiter implement some kind of fairness protocol. The intent of a fairness protocol is to assure that all devices receive a turn on the bus. For instance, one conventional fairness protocol is a round robin scheme. Under a round robin fairness protocol, a device which has just completed a bus operation is not granted access to the bus for a second operation until all the requesting devices have first been granted access to the bus.

Even though a bus may provide a fairness protocol in the arbiter(s) that control access to the bus, acceptable access to the bus can be effectively denied to a device or devices by other high performance devices. This is an unexpected problem that fairness protocols were intended to avoid. The problem is that of "beat" frequencies that interfere with a device's access to the bus. The concept of this "beat" frequency will be described below.

Some buses such as PCI provide a performance feature usually referred to as "backoff" capability that allows a device to disconnect from the bus if it is not able to handle the request at that time. This capability in PCI is referred to as Retry. If a PCI device is not able to handle a request when it occurs the target of the request can issue a "Retry" which indicates to the master that issued the request on the bus to try again later.

For PCI, the typical platform provides a PCI host bridge to provide bus synchronization between the system bus and the PCI bus. The platform may also provide a number of PCI-to-PCI bus bridges to provide additional PCI bus segments. Usually each PCI bus segment will have its own arbiter (with fairness protocol). Each bridge usually has posting buffers for temporary buffering of bus transactions as these transactions flow through the bridge in both directions (primary side to secondary side, and secondary side to primary of a bridge).

The way a beat frequency can deny a device effective access to the bus involves interaction between the set of buffers in a bridge, the bridge arbiter, and the bus traffic by devices on the bus. For example, assume a bus under a PCI host bridge or PCI-to-PCI bridge has a round-robin fairness protocol to four devices under the bridge (Device A, Device B, Device C, and Device D). Also assume the bridge is assigned the highest priority (priority 0), Device A is assigned the next highest priority (priority 1), Device B is assigned the next highest priority (priority 2), Device C is assigned the next highest priority (priority 3), and Device D is assigned the next highest priority (priority 4). If all devices ask for the bus at the same time, the fairness protocol will assure that each devices get a chance to try to utilize the bus. The arbitration priority, in this example, simply determines the order in which the devices get a turn to try to utilize the bus. In this example when all devices request use of the bus, the bridge is granted first access, then Devices A to D in sequence. Under this scheme, both Device A and B could get a turn on the bus and fill up the bridge's buffers such that when Device C gets on the bus, Device C gets a Retry because the bridge's buffers are full. Eventually, the bridge empties out some of the buffers as transactions on the other side of the bridge. Then Devices D, A and B get turns on the bus, again filling the buffers. When Device C gets its rotating turn on the bus again, it again receives a Retry because the bridge's buffers are full again. A beat frequency can occur such that each time a specific device gets a turn on the bus it is turned away with a Retry (or equivalent, depending on the bus type) because other devices keep filling up the bridge buffers. When the number of Retries are relatively high, the device can overrun or underrun resulting in significant performance losses from software detecting the overrun or underrun and repeating the operation.

Simply adding more buffers to the bridge only changes the amount of data that Devices A, B, and D need to transfer to produce the "beat" frequency problem. Adding a very large number of buffers should eliminate the problem but this would be impractical because it is too expensive.

What is needed, therefore, is a scheme that changes the arbitration priority level so that the rotation sequence changed to increase the probability that each device would get a fairness turn on the bus without interference from a beat frequency.

SUMMARY OF THE INVENTION

The previously mentioned needs are fulfilled with the present invention. Accordingly, there is provided, in a first form, a computer system having a local bus which communicates to a CPU through a bus bridge, wherein the bus bridge contains a bus arbiter for controlling and prioritizing bus request signals from a plurality of bus devices connected to the bus. The granting of the bus is based on each devices priority, previous access within a fairness cycle, and retry history. Also disclosed is a bus arbiter containing fairness logic for controlling and prioritizing bus request signals based on a predetermined priority of each bus device and each bus device's prior access within a fairness cycle. The arbiter contains logic for granting control of the bus to a bus device based on the fairness logic.

The invention also includes a method for bus arbitration in a computer system comprising the steps of receiving bus request signals from several bus devices, starting a fairness cycle, selecting a single bus device from the bus devices based on the highest priority of bus devices with respect to other devices and whether or not fairness flag is set for the bus device. If the flag is set, then the priority is reduced. Flags are only set if the devices are granted access to the bus and do not receive a retry signal.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The principles of the present invention and their advantages are best understood by referring to the illustrated embodiment depicted in FIGS. 1–4 of the drawings, in which like numbers designate like parts. In the following description, well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry or mechanisms used to control the rotation of the various elements described herein are omitted, as such control circuits are within the skills of persons of ordinary skill in the relevant art.

The present invention may be applicable in a variety of computers under a number of different operating systems. The computer may be, for example, a personal computer, a mini-computer, or a mainframe computer.

Figure 1:
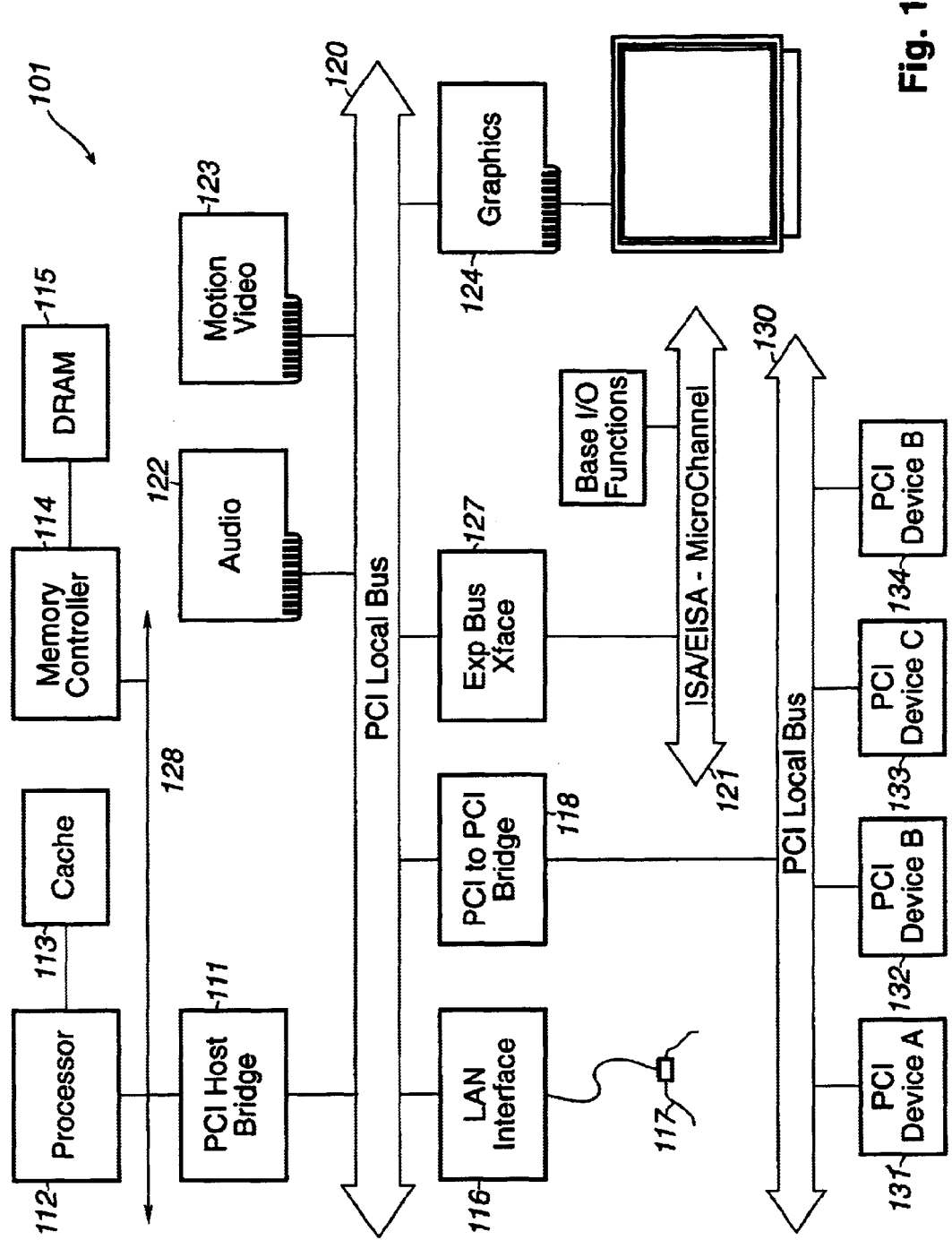
FIG. 1 is a block diagram of a typical computer system having a PCI local bus architecture, which may utilize a preferred embodiment of the present invention.

Referring now to the drawings and in particular to FIG. 1, there is depicted a block diagram of a typical computer system having a PCI local bus architecture, which may utilize a preferred embodiment of the present invention. As shown, a processor 112, a cache memory 113, a memory controller 114, and a Dynamic Random Access Memory (DRAM) 115 are connected to a system bus 128 of a computer system 101. Processor 112, cache memory 113, memory controller 114, and DRAM 115 are also coupled to a PCI local bus 120 of computer system 101 through a PCI host bridge 111. PCI host bridge 111 provides a low latency path through which processor 112 may directly access PCI devices mapped anywhere within bus memory and/or I/O address spaces. PCI host bridge 111 also provides a high bandwidth path for allowing a PCI device to directly access DRAM 115. PCI host bridge 111 may include various functions such as data buffering/posting and arbitration.

Also attaching to PCI local bus 120 may be other devices such as a local-area network (LAN) interface 116 and an expansion bus interface 127. LAN interface 116 is for connecting computer system 101 to a local-area network 117 such as Ethernet or Token-Ring. The configuration may also support separate PCI local buses under separate PCI host bridges. For example, PCI-to-PCI bridge 118 allows PCI local bus 130 to connect to PCI local bus 120. A variety of PCI devices 131, 132, 133, and 134 are attached to PCI local bus 130. Expansion bus interface 127 couples any other non-PCI peripheral buses 121 such as ISA bus, EISA bus, and/or MicroChannel Architecture (MC-A) bus to PCI local bus 120. Typically, various non-PCI peripheral devices for performing certain basic I/O functions are attached to one of the peripheral buses, such as peripheral bus 121.

In general, PCI local bus 120 and PCI local bus 130 may support up to four add-in board connectors without requiring any expansion capability. Audio adapter board 122, motion video adapter board 123, and graphics adapter board 124 are examples of some devices that may be attached to PCI local bus 120 or PCI local bus 130 via add-in board connectors.

Figure 2:
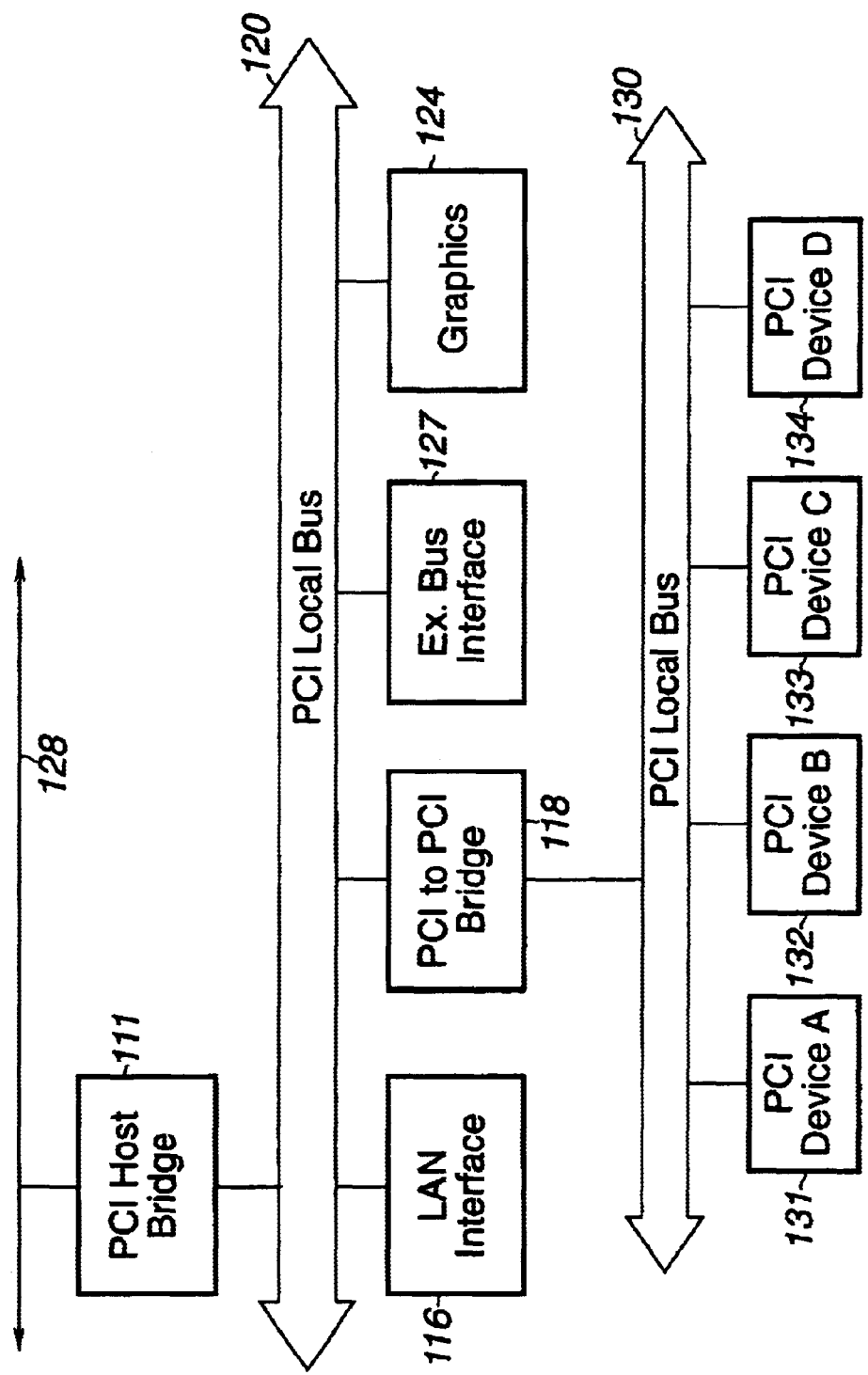
FIG. 2 is a detail block diagram of an isolated computer configuration showing separate PCI local buses under a PCI host bridge and a PCI-to-PCI bridge, which may utilize a preferred embodiment of the present invention.

With reference now to FIG. 2, there is illustrated a detailed view of the PCI configuration showing separate PCI local buses under a host bridge and a PCI-to-PCI bridge. A PCI host bridge 111 enables communications between bus agents coupled to system bus 128 and bus agents coupled to a PCI local bus 120. Further, a PCI-to-PCI bridge 118 enables communications between bus agents coupled to an PCI local bus 130 (PCI local bus 130 is a peripheral bus) and memory controller 114 (FIG. 1). PCI-to-PCI bridge 118 also enables communications between processor 112 and bus agents coupled to PCI local bus 130.0

LAN interface 116, peripheral bus 121, and graphic adaptor board 124 are bus agents coupled for communication over PCI local bus 120. In addition, PCI host bridge 111 and PCI-to-PCI bridge 118 are coupled as bus agents for communication over PCI local bus 120. PCI host bridge 111 and PCI-to-PCI bridge 118 have the capability to be initiators and targets for access cycles over PCI local bus 120. In a preferred embodiment, PCI local bus 120 comprises 32-bit memory address and 32-bit I/O address spaces, having addresses and data multiplexed over the same bus.

Bus bridges, such as PCI host bridge 111 and PCI-to-PCI bridge 118, are typically coupled between a primary bus and a secondary bus. A bus bridge enables an access request that initiates on the primary bus to have a destination on the secondary bus, and enables an access request that initiates on the secondary bus to have a destination on the primary bus. For example, after receiving an access request from system bus 128, PCI host bridge 111 will initiate an access request on PCI local bus 120 to communicate with one or more of PCI devices 116, 118, 127 or 124. Or, after receiving an access request from PCI local bus 120, PCI host bridge will initiate an access request on system bus 128 to communicate with memory controller 114. Similarly, after receiving an access request from PCI local bus 130, PCI-to-PCI bridge 118 will initiate an access request on PCI local bus 120 to communicate with PCI host bridge 111. Or, after receiving an access request from PCI local bus 120, PCI-to-PCI bridge 118 will initiate an access request on PCI local bus 130 to communicate with PCI device 131.

In sum, PCI host bridge 111 enables communications between bus agents coupled to system bus 128 and bus agents coupled to PCI local bus 130. Attaching to PCI local bus 130 are PCI devices, such as PCI devices 131 to 134.

Figure 3:
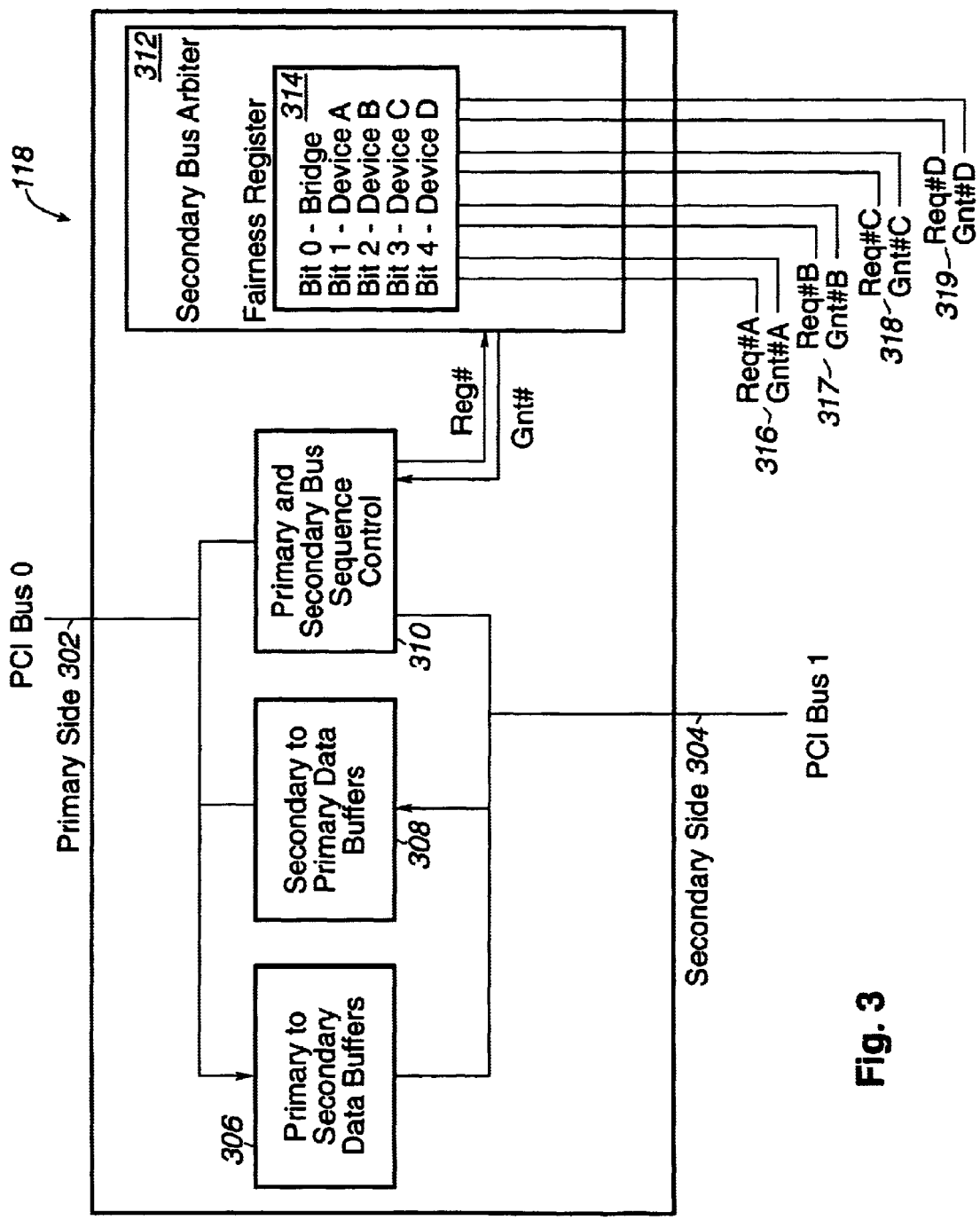
FIG. 3 is a functional block diagram of a PCI-to-PCI bridge, which may utilize a preferred embodiment of the present invention.

Referring now to FIG. 3, there is illustrated a block diagram of PCI-to-PCI bridge 118 which may be used with a preferred embodiment of the present invention. As shown, PCI-to-PCI bridge 118 has two sides, namely, a primary side 302 from which communications travel to and from the primary PCI bus or PCI local bus 120 and a secondary side 304, from which communications travel to and from the secondary PCI bus or PCI local bus 130. (In the PCI architecture, the term "primary side" is simply used to denote the side of a bridge closer to the CPU and memory and the term "secondary side" refers to the side further from the CPU and memory.) A series of data buffers 306 are provided for temporarily storing requests, data and instructions for communications going from PCI local bus 120 to PCI local bus 130 (i.e., the primary bus to the secondary bus). Similarly, there is also a series of data buffers 308 for temporarily storing requests, data and instructions for communications going from PCI local bus 130 to PCI local bus 120 (i.e., the secondary bus to the primary bus). The Primary and Secondary Bus Sequence Control or Sequence Control Unit 310 initiates master transactions and responds to target transactions on the primary and secondary interfaces of PCI-to-PCI bridge 118 as described in the PCI Local Bus Specification, Revision 2.2, published by the PCI Special Interest Group of Portland, Oregon ("PCI Bus Specification"). Sequence Control Unit 310 initiates a request for bus access on the Secondary Side 304 of the PCI-to-PCI bridge. Each of the devices (A through D) also has a sequence control unit (not shown) that conforms to the requirements of the PCI Bus Specification. The sequence control units control the respective PCI bus signal sequencing once it has been granted the bus as a master or has been addressed as a target by another master. The Secondary Bus Arbiter 312 performs arbitration for the PCI-to-PCI bridges Secondary Side 304 using signals REQ# and GNT# (FIG. 3) and conforms to the arbitration requirements of the PCI Bus Specification. It also contains the Fairness register 314 that provides for the storage of plurality of data values. An embodiment of the present invention may have a register containing five bits of information corresponding to the PCI configuration of FIG. 2 having devices 131–134 on local bus 130. The interoperation between the Sequence Control Unit 310 and the Secondary Bus Arbiter 312 conform to the requirements of the PCI Bus Specification as enhanced by the Fairness Register 314 described in this invention. The REQ#A/GNT#A through REQ#D/GNT#D signals supported by the Secondary Bus Arbiter 312 are the request/grant signals used by Devices A through D (In FIG. 2, devices 131 through 134 respectively) to request access to the PCI Bus 130.

Bus arbiter 312 contains a fairness register 314 which contains a fairness bit for each request line 316, 317, 318, and 319 (each device has its own request signal on the bus). The bit assignments in the Fairness Register 314 (bit 0 is assigned to the bridge 118, bit 1 is assigned to Device A, bit 2 is assigned to Device B, bit 3 is assigned to Device C, and bit 4 is assigned to Device D.

The arbitration algorithm used by the Secondary Bus Arbiter can be any algorithm that satisfies the requirements of the PCI Bus Specification. The algorithm can also be a simple linear priority algorithm when used in conjunction with the fairness register 314. The use of the fairness register 314 is a necessary addition to the simple linear priority algorithm to make it PCI Bus specification compliant. The remainder of this description will discuss a simple linear priority as modified by the effect of the fairness register 314.

PCI-to-PCI bridge 118 is given the highest priority. Device A (i.e., device 131 of FIG. 2), which is associated with the request signal REQ#A, is given the next highest priority. Thus,. Device A will initially gain access to the bus in favor of the other contending devices that are requesting access at about the same time. Device B (i.e., device 132 of FIG. 2), then Device C (i.e., device 133 of FIG. 2), and finally Device D (i.e., device 134 of FIG. 2) is the sequence of priority for the remainder of the devices on PCI bus 130.

Figure 4A:
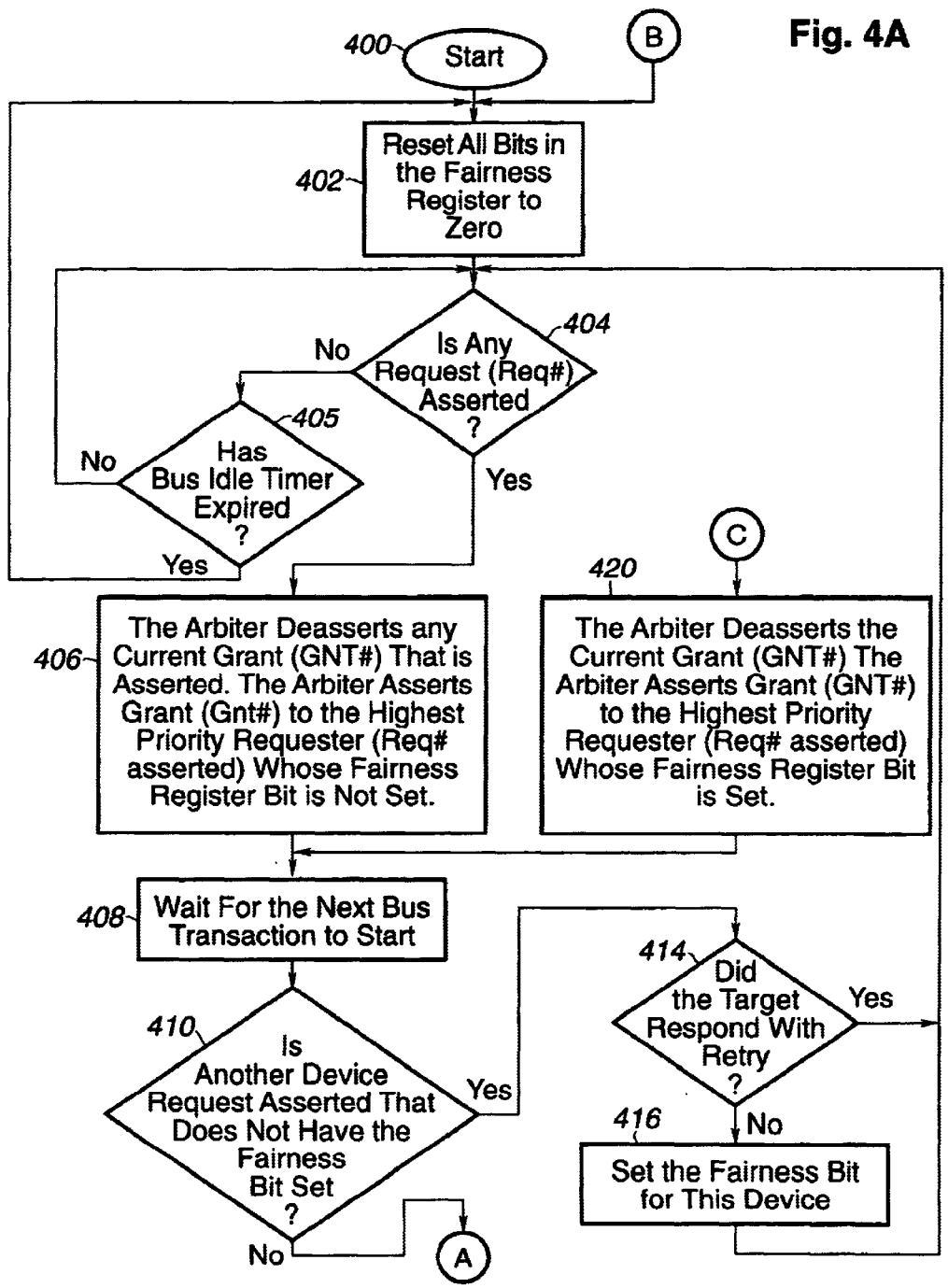
FIG. 4 is a flow chart describing the logic of the arbitration scheme in a example embodiment of the present invention.
Figure 4B:
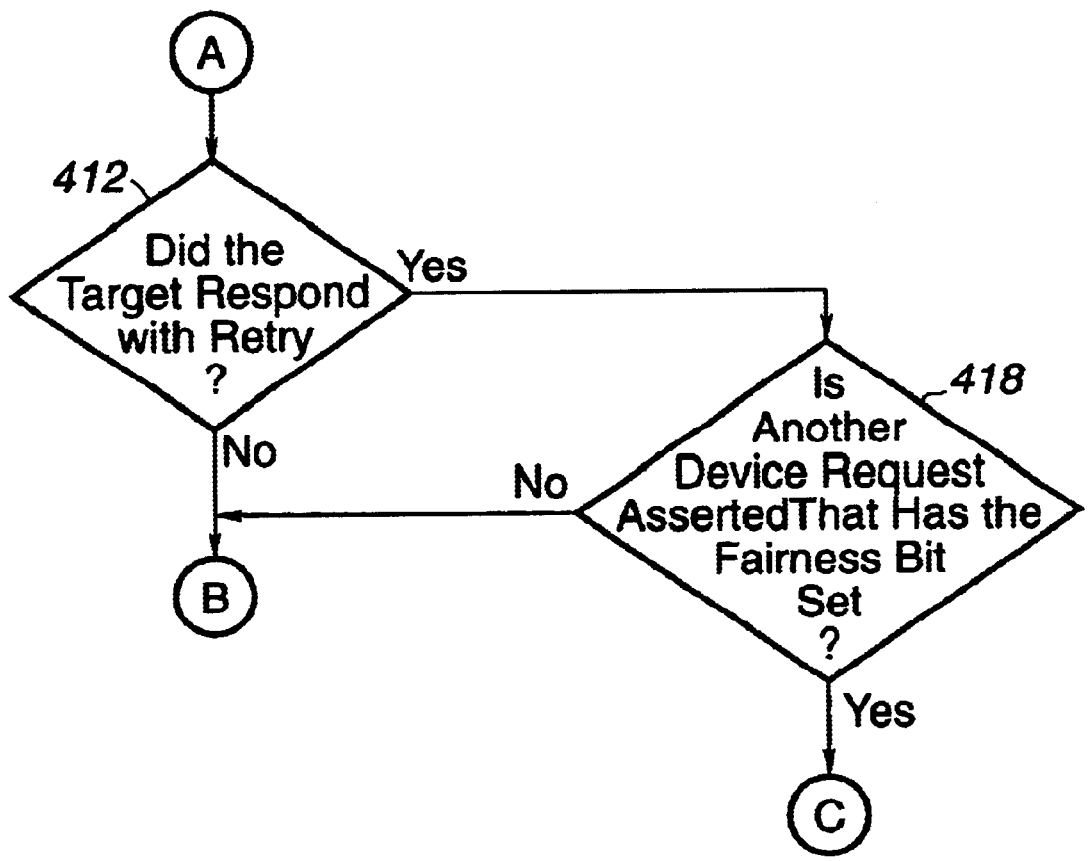

FIGS. 4A and 4B illustrate the logic scheme for arbiter 312. When multiple devices request the bus at the same time the fairness protocol sequence begins (step 400). Arbiter 312 begins the fairness protocol sequence (step 400) begins by resetting all bits in fairness register 314 (FIG. 3) to zero (step 402). Arbiter 312 then checks each of the REQ# signals shown in FIG. 3 from each of the devices (A through D and the bridge) to determine if a request (REQ#) has been asserted (step 404). If there is no request (REQ#) asserted, arbiter 312 determines if a predetermined lapse of time has expired (step 405) by the use of a timer (not shown). The use of the timer limits the idle time on the bus following the Retry to a predetermined amount of time which can be readily set or pre-programmed. If one of the devices that had received the Retry does not attempt to utilize the bus when the timer times out, the fairness bits for all the device would be reset to zero, allowing a new fairness cycle to begin. Such a timer can be as conventionally present in computer systems and is familiar to those who practice the relevant art.

If there is a request (REQ#), arbiter 312 deasserts any current grant (GNT#) that is asserted. Arbiter 312 asserts the grant to the highest priority requester (i.e., REQ# asserted) whose corresponding fairness register bit is not set to one (step 406). Arbiter 312 then waits for the next bus transaction to start (step 408). After the next transaction has started, arbiter 312 determines if any other device request is asserted that does not have its associated Fairness Register 314 bit set to one (step 410). If yes, arbiter 312 determines if the target of the request in step 410 responded with a RETRY (step 414). If the determination in step 414 is yes, arbiter 312 returns to step 404. On the other hand, if the determination in step 414 is no, arbiter 312 sets the fairness bit for this device to one (step 416) and then returns to step 404.

If the determination of step 410 is no, arbiter 312 determines if the target responded with a retry (step 412). If the determination in step 412 is no, arbiter 312 returns to step 402 and resets all bits in the fairness register. On the other hand, if arbiter 312 determined that the target responded with a retry (step 412), arbiter 312 checks to see if another device request asserted has its fairness bit set to one (step 418). If there is not another device with a request asserted and its fairness bit set to one, the routine returns to step 402 and all bits in the fairness register is set to zero. If there is another device, however, with a request asserted and its fairness bit set to one, arbiter 312 deasserts the current grant and asserts a grant to the highest priority requester (using a fairness algorithm) whose fairness register bit is set to one (step 420). Arbiter 312 then repeats step 408.

OPERATION

The manner of using the arbiter can be best illustrated by an example. When multiple devices request the bus at the same time (for instance Device A, B, and C), the fairness routine begins. Once a device receives a turn on the bus without a Retry (makes progress), arbiter 312 will begin ignoring that device's Request Line (Fairness Bit set to 1), until the other devices that also had their Request Lines active receive their turn on the bus. Table 1 shows the arbitration level, the status of request, whether the target responded with a retry, and the fairness bit of each device at the first fairness determination. In this example, the column labeled "Fairness Bit before/after" contain the value of the bits in fairness register 314 (FIG. 3) which are set to 1 in step 416 (FIG. 4a) and reset to 0 in step 402 (FIG. 4a).

TABLE ONE

First Turn, First Cycle

| Device | ARB Level | Turn on Bus | Request? | Retry Received? | Fairness Bit before/after |
|---|---|---|---|---|---|
| Bridge | 0 | — | No | — | 0 |
| Device A | 1 | Yes | Yes | No | 0/1 |
| Device B | 2 | — | Yes | — | 0 |
| Device C | 3 | — | Yes | — | 0 |
| Device D | 4 | — | No | — | 0 |

In the example shown in Table 1, device A has priority and did not receive a retry. The only devices that enter into the arbitration process are those devices that have their request asserted (a Yes in the Request column) and whose Fairness Bit (the bit shown in the Fairness Bit before/after column of the table) is set to Zero. Consequently, Device A was granted access to the bus and its fairness priority bit was set to "1". Thus, future requests will be ignored. The next device to take its turn is device B as illustrated in Table Two.

TABLE TWO

Second Turn, First Cycle

| Device | Priority | Turn on Bus | Request? | Retry Received? | Fairness Bit before/after |
|---|---|---|---|---|---|
| Bridge | 0 | — | No | — | 0 |
| Device A | 1 | — | Yes | — | 1 |
| Device B | 2 | Yes | Yes | No | 0/1 |
| Device C | 3 | — | Yes | — | 0 |
| Device D | 4 | — | No | — | 0 |

As illustrated in Table Two, although Device A has priority, it does not have a turn on the bus because the fairness bit is set to one. Thus, Device B will be granted its turn on the bus. After Device B is granted access, it is Device C's turn on the bus. Assume for purposes of illustration, Device C, however, received a retry from the target. So, its Fairness Bit is not set to a "1" (as shown in Table Three). That is, from a fairness view, it's as if Device C did not receive a turn on the bus, and arbiter 312 will still recognize its Request and Device C can continue to gain access to the bus within the same fairness cycle until it makes progress on the bus (it exchanges information with its target through the bus).

TABLE THREE

Third Turn, First Cycle

| Device | Priority | Turn on Bus | Request? | Retry Received? | Fairness Bit before/after |
|---|---|---|---|---|---|
| Bridge | 0 | — | No | — | 0 |
| Device A | 1 | — | Yes | — | 1 |
| Device B | 2 | — | Yes | — | 1 |
| Device C | 3 | Yes | Yes | Yes | 0/0 |
| Device D | 4 | — | No | — | 0 |

Once Device C gets a turn on the bus without Retry, if other devices also want the bus, the fairness bit of Device C is set to a "1" and its Request will be ignored.

TABLE FOUR

Forth Turn, First Cycle

| Device | Priority | Turn on Bus | Request? | Retry Received? | Fairness Bit before/after |
|---|---|---|---|---|---|
| Bridge | 0 | — | No | — | 0 |
| Device A | 1 | — | Yes | — | 1 |
| Device B | 2 | — | Yes | — | 1 |
| Device C | 3 | Yes | Yes | No | 0/1 |
| Device D | 4 | — | No | — | 0 |

Finally the condition exists (as shown in Table Four) where there are no additional devices on the bus with active Request Lines which have their Fairness Bit=0. At that point, all fairness bits are reset to "0" by arbiter 312 and the fairness cycle can begin again as illustrated in Table 5:

TABLE FIVE

First Turn, Second Cycle

| Device | Priority | Turn on Bus | Request? | Retry Received? | Fairness Bit before/after |
|---|---|---|---|---|---|
| Bridge | 0 | — | No | — | 0 |
| Device A | 1 | Yes | Yes | No | 0/1 |
| Device B | 2 | — | Yes | — | 0 |
| Device C | 3 | — | Yes | — | 0 |
| Device D | 4 | — | No | — | 0 |

Note that with this solution arbiter 312 would be denying access to the bus (by ignoring the device's Request) for devices that have made progress, while granting extra accesses to the bus during a fairness cycle for devices that previously received a Retry. The timer limits the idle time on the bus following the Retry. Thus, if one of the devices that had received the Retry does not attempt to utilize the bus when the timer times out, the fairness bits for all the device would be reset to zero, allowing a new fairness cycle to begin.

In sum, the arbiter has several substantial advantages over the prior art. With this solution, the arbitration levels can remain the same and each device that receives a Retry on its turn on the bus can receive extra turns on the bus during the same fairness cycle until their transactions on the bus are handled (they make progress). Thus, no device is denied access to the bus because of Retry signals.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It is therefore, contemplated that the claims will cover any such modifications or embodiments that fall within the true scope of the invention.

What is claimed is:

1. A computer system comprising:
    a microprocessor;
    a local bus coupled to said microprocessor through a bus bridge, wherein said bus bridge is configured to accommodate data transfers between said microprocessor and said local bus; and
    a bus arbiter within said bus bridge for controlling and prioritizing bus request signals from a plurality of bus devices coupled to said bus wherein said bus arbiter contains logic to grant control of said bus to a first bus device of said plurality of bus devices based on a predetermined priority of said first bus device relative to other bus devices and said first bus device's prior access to said bus within a fairness cycle, wherein said bus arbiter further contains logic wherein said control is granted in response to a bus device's prior unsuccessful access to said bus within said fairness cycle, and if each bus device is successful within said fairness cycle then in response to said predetermined priority of said first bus device relative to other bus devices.

2. The computer system of claim 1, wherein said prior access is recorded by setting at least one flag when said first bus device receives access to said bus and first bus device does not receive a retry signal.

3. The computer system of claim 2, wherein said first bus device's priority is reduced below that of other requests signals when said fairness flag is set.

4. The computer system of claim 2, wherein each said fairness flag comprises a bit in a data register unit controllable by said arbiter.

5. The computer system of claim 1 wherein said fairness cycle initiates in response to at least one bus request when said bus is idle and ends when each requesting bus device successfully completes a transfer on said bus.

6. A computer system comprising:
    a microprocessor,
    a local bus coupled to said microprocessor through a bus bridge, wherein said bus bridge is configured to accommodate data transfers between said microprocessor and said local bus; and
    a bus arbiter within said bus bridge for controlling and prioritizing bus request signals from a plurality of bus devices coupled to said bus wherein said bus arbiter contains logic to grant control of said bus to a first bus device of said plurality of bus devices based on a predetermined priority of said first bus device relative to other bus devices and said first bus device's prior access to said bus within a fairness cycle, wherein said bus arbiter further contains logic wherein said control is granted in response to a bus device's prior unsuccessful access to said bus within said fairness cycle, and if each bus device is successful within said fairness cycle then in response to said predetermined priority of said first bus device relative to other bus devices, wherein said prior access is recorded by setting at least one flag when said first bus device receives access to said bus and first bus device does not receive a retry signal, and wherein said first bus device's priority is reduced below that of other requests signals when said fairness flag is set; and
    a timer coupled to said bus arbiter, said timer being started when a retry signal has been sent to a bus device, wherein after the lapse of a predetermined period as determined by said timer, all fairness flags return to an unset position.

7. The computer system of claim 6, wherein said predetermined period is programmable.

8. A bus arbiter for a computer system, the computer system having a bus for connection to a plurality of bus devices where each bus device requests control of said bus by use of a bus request signal, the bus arbiter comprising:
    logic incorporating a fairness scheme for controlling and prioritizing bus request signals based on a predetermined priority of each bus device and each bus device's prior access within a fairness cycle, and
    logic for granting control of said bus to a bus device based on said prioritization scheme and fairness scheme, wherein said prior access is recorded by setting a corresponding flag when a first bus device receives access to said bus and first bus device does not receive a retry signal.

9. The bus arbiter of claim 8, wherein said first bus device's priority is reduced to below that of other requests signals when said fairness flag is set.

10. The bus arbiter of claim 8, wherein each said flag comprises a bit in a data register unit controllable by said arbiter.

11. The bus arbiter of claim 8, wherein said fairness cycle initiates in response to at least one bus request when said bus is idle and ends when each requesting bus device successfully completes a data transfer on said bus.

12. A bus arbiter for a computer system, the computer system having a bus for connection to a plurality of bus devices where each bus device requests control of said bus by use of a bus request signal, the bus arbiter comprising:

logic incorporating a fairness scheme for controlling and prioritizing bus request signals based on a predetermined priority of each bus device and each bus device's prior access within a fairness cycle, and logic for granting control of said bus to a bus device based on said prioritization scheme and fairness scheme, wherein said prior access is recorded by setting a corresponding flag when a first bus device receives access to said bus and first bus device does not receive a retry signal, and wherein said first bus device's priority is reduced to below that of other requests signals when said fairness flag is set, and wherein each said flag comprises a bit in a data register unit controllable by said arbiter; and a timer coupled to said bus arbiter, said timer being started when a retry signal has been sent to a bus device, wherein after the lapse of a predetermined period as determined by said timer, all fairness flags return to an unset logic state.

13. The bus arbiter of claim 12, wherein said predetermined period is programmable.

14. A method for bus arbitration in a computer system, having a bus for connection to a plurality of bus devices where each bus device requests control of said bus by use of a bus request signal, the method comprising the step of:

(a) selecting a first bus device for access to said bus from said plurality of bus devices in response to a predetermined priority of bus devices with respect to other devices of said plurality of bus devices and a first logic state of corresponding flag, wherein said flag is operable for setting to a second logic state in response to a corresponding bus transaction effecting an exchange of information across said bus, and starting a fairness cycle before selecting said first bus device.

15. The method of claim 14 further comprising the steps of:

(b) determining if said retry signal is received, if said retry signal is not received, setting the corresponding flag to said second logic state; and (c) repeating steps (a) through (c) until all requests have been processed.

16. The method of claim 15 further comprising the step of:

(d) granting access to said bus based on selecting said bus device in step (a).

17. The method of claim 16, further comprising the step of determining whether a predetermined period of time has expired if no request has been asserted, if not repeating steps (b), and if said lapse has expired, repeating steps (d), (b), and (c).

18. The method of claim 17, wherein said predetermined period of time is determined by a timer coupled to said bus arbiter.

19. The method of claim 18, wherein said predetermined period is programmable.

20. The method of claim 18 wherein said current fairness cycle ends when each bus device requesting bus access successfully completes a data transfer on said bus.

21. The method of claim 14, wherein step (a) further comprises the additional step of setting a plurality of flags to an initial state after starting said fairness cycle.

22. The method of claim 14, wherein said flag is a register bit coupled to a bus arbiter.

23. The method of claim 14 further comprising the step of:

(b) if corresponding flags are all in said second logic state a current fairness cycle ends and said bus access is determined in response to said predetermined priority.

24. The method of claim 14 further comprising the step of:

(b) repeating step (a) until all flags corresponding to each device of said plurality requesting access to said bus are in said second logic state.

25. A computer program product embodied in a machine readable medium, the program product executable by machine to perform a method for arbitration of a plurality of bus device requests for control of a bus comprising the steps of:

(a) starting a fairness cycle;

(b) setting a plurality of flags to an initial state;

(c) selecting a single bus device from said plurality of bus devices based on the highest priority of bus devices with respect to other devices of said plurality of bus devices and whether a corresponding flag has not previously been set;

(d) determining if a said retry signal is received, if said retry signal is not received, setting said corresponding flag and repeating steps (d) through (e); and (e) repeating steps (c) through (e) until all requests in said fairness cycle have been processed.

26. The program product of claim 25, wherein step (c) further comprises determining whether a predetermined period of time has expired if no request has been asserted, if not repeating step (c), if said lapse has expired repeating step (b) through (c).

27. The program product of claim 26, wherein said predetermined period of time is determined by a timer coupled to said bus arbiter.

28. The program product of claim 27, wherein said predetermined period is programmable.

29. The program product of claim 25, wherein said method further comprises the step of, if all said flags are set, selecting for bus access a bus device in response to said predetermined priority.

30. The program product of claim 25 wherein said method further comprises the step of:

(b) repeating step (a) until all flags corresponding to each device of said plurality of bus devices requesting bus access are set.

31. The program product of claim 25 wherein said fairness cycle initiates in response to at least one bus request when said bus is idle and ends when each requesting bus device successfully completes a transfer on said bus.

* * * * *